C. J. NYQUIST.
ART OF CLAMPING HOSE LINES.
APPLICATION FILED NOV. 18, 1918.
1,309,332.
Patented July 8, 1919.
2 SHEETS—SHEET 1.
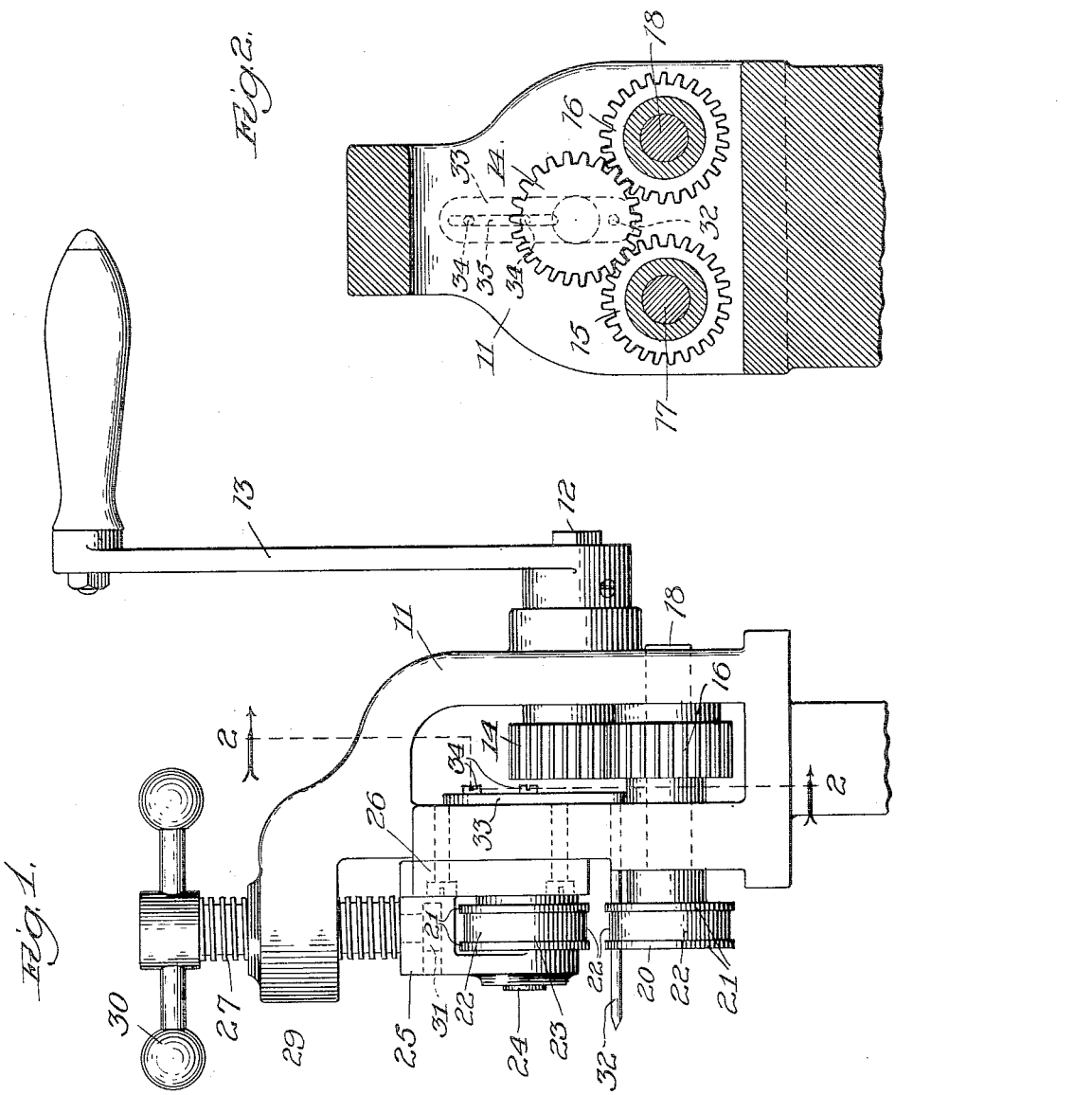
Inventor:
Carl J. Nyquist,
By Dyrenforth, Lee, Chritton and Wiles
Att'ys

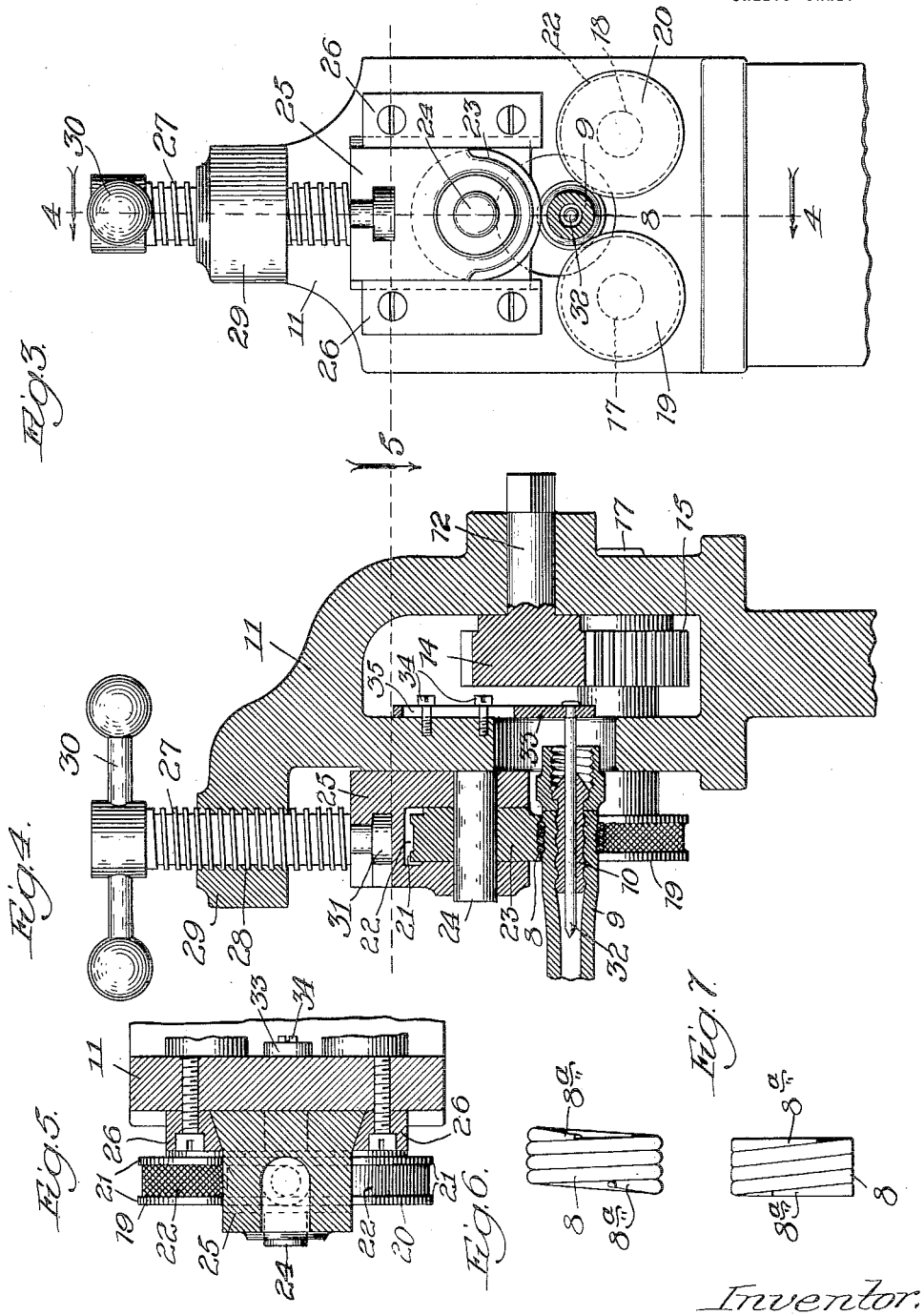

UNITED STATES PATENT OFFICE.

CARL J. NYQUIST, OF CHICAGO, ILLINOIS.

ART OF CLAMPING HOSE-LINES.

1,309,332.

Specification of Letters Patent.

Patented July 8, 1919.

Application filed November 18, 1918. Serial No. 263,001.

*To all whom it may concern:*

Be it known that I, CARL J. NYQUIST, a citizen of the United States, residing at Chicago, in the county of Cook and State of Illinois, have invented a new and useful Improvement in the Art of Clamping Hose-Lines, of which the following is a specification.

My invention relates more particularly to improvements in the art of clamping flexible hose in position on a relatively rigid tube or pipe-section, as for example, rubber hose upon a nipple.

My primary object is to provide for readily, quickly and securely clamping the hose-line in place to form a joint which will be fluid-tight under high pressures, and to produce such a joint in a highly economical manner and without injury to the hose-line.

Referring to the accompanying drawings—

Figure 1 is a view in elevation of a machine constructed in accordance with my invention. Fig. 2 is a section taken at the line 2—2 on Fig. 1 and viewed in the direction of the arrows. Fig. 3 is a view in elevation of the machine of Fig. 1 viewing the latter from the left-hand side in the last referred to figure, this view showing a nipple and hose-line in position therein during the application thereto of the clamping means. Fig. 4 is a section taken at the line 4—4 on Fig. 3 and viewed in the direction of the arrows. Fig. 5 is a section taken at the line 5—5 on Fig. 4 and viewed in the direction of the arrow. Fig. 6 is a side view of the hose clamp employed before it has been acted on by the machine of the preceding figures to clamp the hose in place; and Fig. 7, a view like Fig. 6 showing the condition of the clamp of this figure after it has been acted upon by the machine to effect the clamping operation.

As a preface to the following description it may be stated that the general principle underlying my invention consists in contracting, by a rolling operation, a member forming the clamp comprising a piece of wire wound into a spiral and surrounding the hose-line at the point thereof at which it is to be joined to a nipple, or the like, the clamp thereby becoming set in contracted condition.

In carrying out my invention, I may provide the clamp as shown in Fig. 6 and represented at 8, this clamp being formed of wire, preferably relatively soft steel wire and wound into a spiral, as shown, with its opposite ends and also the various turns thereof free, and its ends preferably beveled as indicated at $8^a$. The clamp 8 in practice would be assembled with the hose-line and nipple, or the like, in any suitable way, the clamp surrounding the hose-line at that portion thereof which surrounds the nipple, as for example, as represented in Fig. 4 wherein the hose-line is represented at 9 and a nipple to which the hose is to be connected, at 10. The clamp 8 is then subjected to a rolling action performed in such a manner as to effect the contracting of the clamp about the hose-line which thus becomes set and rigidly clamps the hose in place.

In Figs. 1 to 5, inclusive, I have illustrated a very desirable construction of machine for producing a rolling of the clamp to contract the latter about the hose-line. The machine as shown comprises a casting 11 adapted to be supported in any suitable manner. A shaft 12 which may be provided with an operating crank 13 is journaled in the casting 11 and has rigidly secured thereon a gear 14, which meshes with gears 15 and 16 rigid on shafts 17 and 18 journaled in the casting 11, the shafts 17 and 18 having rigid thereon rollers 19 and 20, provided at their peripheries at opposite edges thereof with annular flanges 21 forming annular channels 22 in the peripheries of these rollers, which by reason of their gear connection with the shaft 12 are positively driven in the same direction. Coöperating with the rollers 19 and 20 is a third, idler, roller 23 flanged about its periphery, as explained of the rollers 19 and 20, this idler roller being rotatable on a shaft 24 mounted in a slide 25 confined in guides 26 on the casting 11 to have movement toward and away from the rollers 19 and 20, the slide 25 being operatively connected with means for forcing it toward the rollers 19 and 20, these means as shown comprising a screw 27 screwing in a threaded opening 28 in an extension 29 of the casting 11, this screw being provided with a hand-piece 30 for rotating it and having swivel connection at 31 with the slide 25. The rollers 19, 20 and 23 are arranged in spaced relation and extend in the same plane, and extending into the space between these rollers is a rod 32 mounted on a plate 33, supported on the casting 11, in a manner to permit it to adjust itself toward and away from the rollers 19 and 20, the means shown for supporting the plate 33 to permit it to shift as stated comprising headed studs 34, shown as machine screws, carried by the casting 11 and spaced apart vertically and which extend through a slot 35 in the plate 33 and serve as guides for this plate in its movement.

In the use of the machine illustrated, the operator applies the hose 9 to the nipple 10 with the clamp 8 positioned as shown in Fig. 4 and introduces these assembled parts into the space between the rollers 19, 20 and 23, to a position wherein the clamp 8 extends in line with the grooves 22 in the several rollers, the nipple 10 in this operation being slipped over the rod 32 as shown in Fig. 4. The operator then forces the roller 23 toward the rollers 19 and 20 and against the clamp 8, and while the pressure is thus applied to the clamp, operates the crank 13 to rotate the rollers 19, 20 and 23. The latter, it will be noted, all rotate in the same direction and the result of thus rotating them while pressed into engagement with the clamp 8, by the manipulation of the slide 25 as stated, is to contract the clamp 8 about the hose-line 9 to obtain a result substantially equivalent to the contracting of the clamp by grasping its opposite ends and pulling them in a direction toward each other, namely, in a direction to contract the spiral, the curved surfaces of the spiral at its periphery becoming somewhat flattened in this operation. In so acting on the clamp, the flanges 21 serve to confine the clamp against spreading and insure the contracting of the spiral, as for example, to the condition shown in Fig. 7.

It will be understood that the manipulation of the machine to apply the desired pressure to the clamp and the rolling action referred to, may be accomplished in any suitable manner, as for example, by alternating the feeding of the roller 23 toward the rollers 19 and 20, with the rotation of these rollers, thus affording a step-feed in alternation with the rolling action, or the rolling action may be performed simultaneously with the feed, which latter may be either continuous or step by step, and the rollers to perform the rolling operation may be driven in one direction only, or first in one direction and then in another while operating on a piece of work.

The rod 32 serves to steady the work being operated on, preventing wabbling thereof which, if the latter did occur, would prevent the exertion of uniform pressure of the clamp against the hose-line, this rod being adjustable as stated to adapt it to perform its function with nozzles and hose-lines of different sizes.

The rolling of the clamp, as stated, causes the clamp to grip the hose-line with substantially uniform pressure throughout the length of the clamp and while producing a fluid-tight joint capable of withstanding high pressures in the hose-line, does not injure the hose-line as has been demonstrated in practice, the turns of the spiral at the inner surface thereof remaining of curved shape in cross-section. Furthermore, the clamp may be readily removed, if desired, by merely inserting a tool under one of its free ends and unwinding the spiral.

What I claim as new and desire to secure by Letters Patent is:

1. The method of clamping a hose-line to a tube-section, which consists in surrounding the hose-line at the portion thereof embracing the tube-section, with a clamping element formed of wire wound into a spiral with its ends free, and contracting said element about the hose-line by subjecting the element to a rolling action.

2. The method of clamping a hose-line to a tube-section, which consists in surrounding the hose-line at the portion thereof embracing the tube-section, with a clamping element formed of wire wound into a spiral with its ends free, and contracting said element about the hose-line by the action of rollers pressed against the periphery of said element and between which the element is confined.

CARL J. NYQUIST.